July 4, 1967 C. P. HEROLD ETAL 3,329,449
SEALED SWIVEL JOINT FOR FLUID SYSTEMS
Filed Dec. 2, 1964
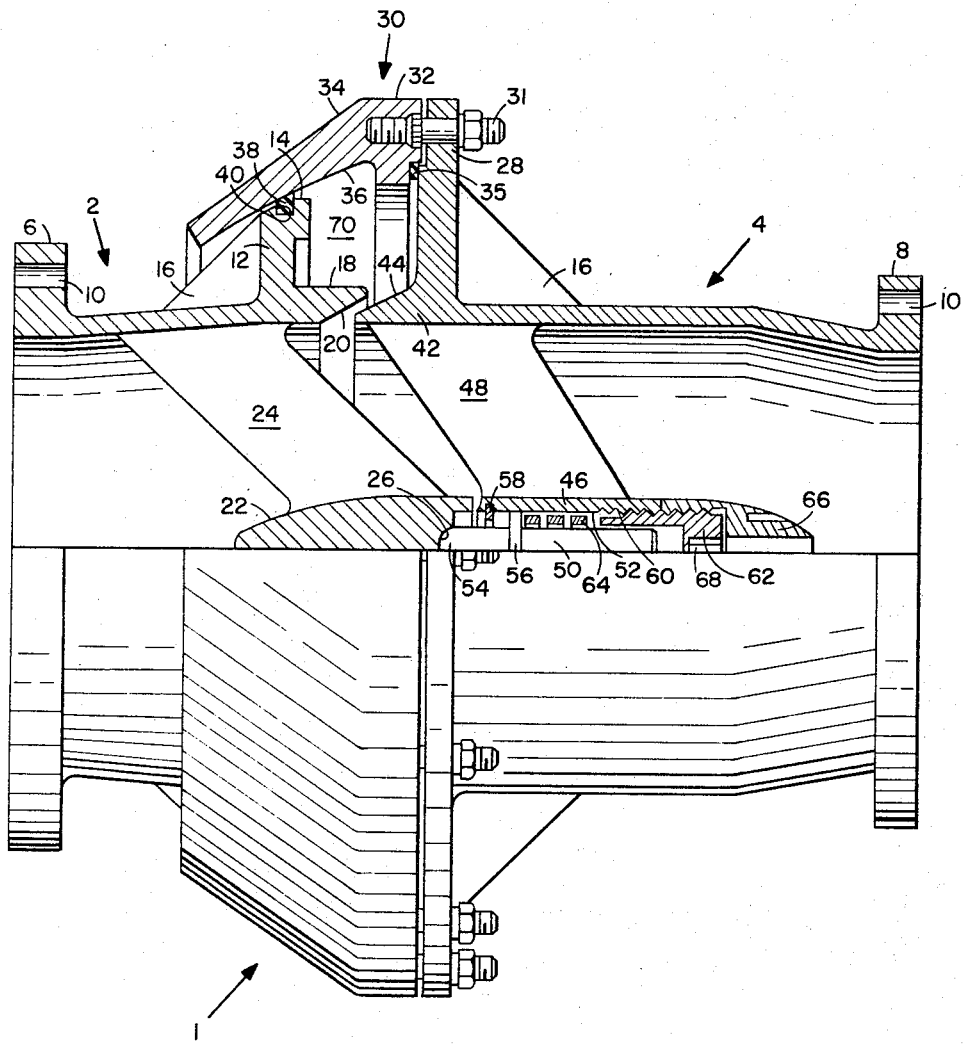
Curt P. Herold
Glenn W. Travis
Sam D. Stahley,
INVENTORS.
BY
ATTORNEYS

United States Patent Office 3,329,449
Patented July 4, 1967

3,329,449
SEALED SWIVEL JOINT FOR FLUID SYSTEMS
Curt P. Herold, Huntsville, Glenn W. Travis, Hartselle, and Sam D. Stahley, Huntsville, Ala., assignors, by direct and mesne assignments, to the United States of America as represented by the Secretary of the Army
Filed Dec. 2, 1964, Ser. No. 415,518
3 Claims. (Cl. 285—269)

ABSTRACT OF THE DISCLOSURE

A swivel joint for fluid flow lines, the joint comprising a pair of coupling members having their respective juxtaposed, inner ends joined together to allow swiveling movements and their respective opposite, distal ends adapted for interconnecting adjacent ends of a fluid line. A first coupling member has a radial flange formed spherically and an annular groove formed in its spherical periphery for receiving a ring seal. The second coupling member has a radial flange of relatively larger diameter than that of the first member and has a spherical housing member detachably secured thereto. The housing provides an inner spherical, bearing surface whereby the first member flange is telescopingly received within the housing so that the ring seal provides line bearing contact with the spherical housing surface during swiveling movements. Each member is provided with an axial hub. The first member hub has a spherical bearing socket while the second member hub carries a spring biased pin and an adjusting plug whereby the sealing and bearing forces between the two members may be varied. A fluid pressure chamber is also provided between the two radial flanges whereby the effectiveness of the ring seal is further enhanced by the pressure of the fluid passing through the fluid line and joint.

The invention described herein may be manufactured and used by or for the Government for governmental purposes without the payment of any royalty thereon.

The present invention relates to coupling or joints for fluid flow lines, and more particularly to a novel, swivable coupling or joint for use with pipes in a pressurized fluid flow system with means for effectively sealing the same.

In cryogenic handling for space vehicles, particularly where swivable and/or rotatable pipe connections are frequently used, it is of prime importance that fluid tight and leak proof connections be utilized. Such leak proof connections must be dependable and capable of withstanding extreme pressures and widely varying temperature conditions without adverse effects. The importance of an effectively sealed joint is apparent, for example, in liquid oxygen fueling systems for missiles and space vehicles wherein a leak anywhere in the liquid flow line may cause the line to disrupt and, thus disrupt the entire fueling operation.

Thus, it is the primary object of this invention to provide, in a piping system, an improved, swivable pipe joint or coupling which is effectively sealed against leakage.

It is a further object of the present invention to provide a self-sealing seal means for a swivel joint, i.e., with the feature wherein the seal is forced into sealing engagement with its coacting surfaces in response to the pressure of the fluid passing through the joint.

Another object of the invention resides in the provision of means for adjusting the loading of a seal disposed between coacting members of a swivable and/or rotatable joint, the adjustment being possible without disassembly of the coupling unit.

A still further object of the invention is to provide a sealed pipe union wherein the coupling members are capable of swiveling action and/or relative rotation with a minimum of bearing friction between the coupling members.

An important feature of the invention resides in the provision of a pipe joint which is highly resistant to shock and vibrations.

These and other objects of the invention will become more apparent upon consideration of the following detailed description and accompanying drawing, in which:

The single figure is a partial, longitudinal section in elevation showing the parts of the sealed swivel joint of the invention in assembled relation as a unit.

Referring to the drawing, numerals 2 and 4 designate, respectively, cylindrical, male and female conduit sections of an assembled fluid coupling or joint 1 whose outer, distal ends are formed with radially extending, annular flanges 6 and 8, each having a plurality of circumferentially spaced apertures 10 for secured connection, as by bolts, to adjacent ends of a fluid line or pipe in a fluid system (not shown). Conduit sections 2 and 4 are each provided at their other, axially inner ends, respectively, with annular, radially outwardly extending flanges 12 and 28, the latter flange being of a greater outside diameter than that of the former flange. The periphery 14 of flange 12 is spherically formed and has an annular groove 40 formed therein. A plurality of reinforcing ribs 16 are provided on the outer circumference of conduit sections 2 and 4. Conduit sections 2 and 4 are further provided, respectively, with beveled, lip flanges 18 and 42, said flanges protruding axially from the base of the respective radial flanges 12, 28. Flange 18 has a radially inwardly facing beveled surface 20 while flange 42 has a radially outwardly facing beveled surface 44.

To provide means for joining the male and female conduit sections, an annular, substantially axially extending housing 30 is provided. Housing 30 includes an annular base portion 32 abuttingly engaging radial flange 28 and secured thereto as by a plurality of circumferentially spaced bolts 31. To effect a seal between abutting surfaces of elements 28 and 32, a seal ring 35 is disposed therebetween. The housing further includes an axially extending body portion 34 of conical configuration, the interior surface 36 of which is spherically formed for telescopingly receiving the aforedescribed spherically formed periphery 14 of flange 12. Thus, conical housing portion 34 forms with radial flange 28 a cup-shaped structure whereby the pair of conduit sections are joined by telescoping engagement of the inner justaposed ends thereof, i.e., the inner end of the male conduit section is received within the cup-shaped structure of the female conduit section.

To effect a seal between surfaces 14 and 36, a suitable seal ring 38 is provided, said seal being disposed in annular groove 40 provided in peripheral surface 14 of flange 12. Seal ring 38, as well as seal means 35, are preferably made of Teflon or a similar suitable material, which will not be appreciably effected by widely varying temperatures and pressures.

To provide a means for application of a predetermined force of seal ring 38 on spherical surface 36 of housing member 34 and to provide a central pivot bearing between conduit sections 2 and 4, the conduit sections are provided with hub means 22 and 46, respectively. Hub means 22 is concentrically supported within male conduit section 2 by integral spokes 24 while hub means 46 is supported concentrically within female conduit section 4 by means of integral spokes 48. The hubs are seen to be in coaxial alignment, with their inner, radial faces in juxtaposed relationship. Hub means 22 is formed on the inner radial face thereof with a spherical, coaxially disposed, socket 26 for receiving the spherically formed, forward end 54 of an elongated pin 50 carried by hub means 46 and, thus, providing substantially point bearing contact and limiting the friction engagement between joint sections 2 and 4.

Pin 50 is disposed for axial movement in an axial bore 52 formed centrally of hub means 46. An annular, radially extending guide shoulder 56 is provided on the circumference of the pin, intermediate its ends, for slidably engaging said bore on axial movement therein. A snap ring 58 is seated in a groove provided in the internal surface of one end of bore 52 for limiting movement of pin 50 in a direction towards the male conduit section, wherein engagement of the adjacent faces of guide shoulder 56 and ring 58 will limit such movement. The opposite end of axial bore 52 is provided on its inner surface with threads 60 for receiving an externally threaded, adjusting plug 62. A heavy-duty compression spring 64, preferably a die-cast type spring, it disposed in surrounding relation with the body of pin 50, one end of said spring engaging guide shoulder 56 of said pin and the opposite end of said spring engaging the inner end of the adjusting plug. Thus, it is seen that head 54 of pin 50 is forcibly engaged within socket 26 by the action of spring 64 with a force determined by the adjusted position of plug 62. A suitable nut 66 is provided to lock the plug in a desired adjusted position, said nut having mating threads for engagement with the threaded exterior of the extended end of the plug, whereby rotation of the nut into tight engagement with the outer end of hub 46 retains plug 62 in a desired adjusted position. To facilitate rotation of the adjusting plug, in effecting an adjustment, the same is provided with a slot 68 in its axially outer end for receiving an adjusting tool, such as an Allen wrench, therein.

A fluid pressure chamber 70 is defined by the space enclosed by the radial, juxtaposed walls of flanges 12 and 28; inner, spherical surface 36 of housing member 34; and the combined radially outer, peripheral surfaces of lip flanges 18 and 42. Pressure fluid being transferred through the joint is permitted communication with said chamber through the space provided between lip flanges 18 and 42, whereby seal ring 38 is forced into sealing engagement with surface 36 of housing 30 in response to the pressure of the fluid being transferred through said coupling joint. Hence, seal 38 is said to be self-sealing.

To assemble the joint, the male conduit section is positioned in juxtaposed, coaxial alignment with the female conduit section wherein lip flange 18 is disposed in overlapping relation with lip flange 42 and rounded head 54 of pin 50 is seated within socket 26 in hub 22. The annular base portion 32 of housing 30 is passed over flange 6 and secured, as by bolts 31, to radial flange 28 of the female conduit section. Accordingly, the male conduit section is telescopingly received within the cup-shaped structure, defined by elements 30 and 28, and retained therein due to the relative diameters of opposite ends of conical housing member 34 and flange 12 of the male conduit section. Seal ring 38 carried by flange 12 engages an intermediate portion of surface 36.

To permit swiveling and relative rotary movement of the conduit sections, pivotal engagement is effected (1) between peripheral portion of seal 38 and inner spherical surface 36 of housing 30 and (2) between pin head 54 and socket 26 of hubs 46 and 22, respectively. Bearing friction is, thus, minimized because (a) there is substantially circular, line bearing contact of ring seal 38 with an intermediate portion of spherical surface 36, and (b) there is substantially point bearing engagement at the center of the hubs, i.e., between pin head 54 and socket 26. Further, as noted hereinabove, seal 38 is preferably formed of a low friction bearing material. Additionally, the pin and socket bearing surfaces may be coated with a low-friction bearing material, if desired, to further reduce bearing friction therebetween said conduit sections.

Initial loading of seal 38 is effected by selectively positioning adjusting plug 62 by rotation thereof and thereby loading spring means 64. Additionally, as heretofore described, the seal is forcibly engaged with spherical surface 36 by pressurized fluid in chamber 70 acting thereon. Thus, adjustment of the force on the seal may be effected as desired in accordance with the predetermined pressure of the fluid being transferred through the joint. Adjustment of plug 62 may be effected without requiring disassembly of the joint unit by merely disconnecting the pipe (not shown) from the outer end flange 8 of the female conduit section, loosening lock nut 66 and engaging a suitable adjusting tool through the hollow lock nut 66 and into the slot means 68 in the end of said adjusting plug and thereby rotating the plug as desired.

It is apparent that joint 1 is substantially unaffected by adverse vibrations and pulsations in the piping system because the resilience of spring means 64 and the inherent resilience of ring seal 38 allows limited relative movement of the coupling sections without disrupting the effectiveness of the sealed joint.

From the foregoing it will be seen that a reliable, self-sealing, swivelable and rotatable coupling is provided. The coupling, according to the invention, is simple in construction, highly effective in transferring high or low pressure fluids, substantially uneffected by vibrations and adverse conditions, and readily adapted for attachment within a piping system. Additionally, the sealing force between the coupling sections of the joint is readily adapted for selective adjustment.

It is to be understood that the specific embodiment of the invention described is merely illustrative of the principle of the invention and that various changes and modifications may be made without departing from the spirit and scope of the invention as set forth in the appended claims.

We claim:
1. A sealed, fluid coupling joint for use in a fluid system for connecting adjacent ends of a fluid line so as to allow swiveling movements, said joint comprising:
   a first conduit section having means at one end thereof for rigid connection with one of the adjacent ends of said fluid line and having a first radially extending flange on the other end thereof, the peripheral surface of said first flange being spherically formed and having an annular groove formed therein;
   a second conduit section juxtaposed said first conduit section and having means at one end thereof for rigid connection with the other of the adjacent ends of said fluid line and having a second radially extending flange on the other end thereof, said second flange being of a larger diameter than that of said first flange;
   an annular housing having an axially extending conical portion provided with an inner spherically formed surface, said housing being circumferentially disposed about said first flange of said first conduit section and being secured at one end thereof with said second flange to define therewith a cup-shaped socket for telescopingly receiving said other end of said first conduit section therein;
   a ring seal disposed in said groove in said first flange and engaging the inner, spherical surface of said housing conical portion to form a fluid seal between said conduit sections, said seal providing circular, substantially line bearing contact between the periphery of said first flange and the inner surface of the housing, said seal forming the sole contact between said first flange and said housing surface;
   a first hub supported by radial spokes coaxially within said other end of said first conduit section, said hub having a spherical bearing socket formed within its axially outer wall and coaxially thereof;
   a second hub juxtaposed said first hub and supported by radial spokes coaxially within said other end of said second conduit section, said second hub having an axial bore extending coaxially thereof;
   an elongated pin positioned in said bore, an annular guide shoulder formed on said pin intermediate the ends thereof and adapted for sliding engagement within said bore, one end of said pin being spherically formed for providing substantially point bearing engagement within said spherical hub socket;

spring means disposed in said axial bore surrounding said pin for continuously biasing the spherical end of said pin into forced, seating engagement within said spherical socket and continuously urging said first and second hubs apart whereby a predetermined force is effected on said seal ring;

adjusting means for selectively varying the axial force on said pin thereby placing a predetermined force on said seal ring, said adjusting means including an adjusting plug threadedly received in the other end of said axial bore, said plug being adapted on rotation thereof for selectively varying the applied force on said pin against the action of said spring, whereas said spring is compressed between one face of said guide shoulder and the inner end of said plug; and stop means within said bore for abutting engagement by the other face of said guide shoulder for limiting axial movement of said pin in a direction toward said first hub.

2. A sealed, fluid coupling joint as defined by claim 1 wherein, a fluid pressure chamber is defined therebetween said first and second radially extending flanges, said chamber being in fluid communication with the interior of said first and second conduit sections whereby said seal ring is forced into engagement with said spherical surface in response to the pressure of the fluid being transferred through said joint.

3. A sealed swivel union for interconnecting adjacent ends of a tubular conduit in a fluid system, said union comprising, in combination:

a first and a second tubular coupling member, said coupling members being disposed with the inner respective ends thereof in juxtaposition and having means at the outer respective ends thereof for connection with the respective, adjacent ends of a tubular conduit;

said first coupling member having at the inner end thereof a first, annular flange, said flange extending radially outwardly from the outer periphery thereof, the outer peripheral surface of said flange being spherically formed and having an annular groove formed therein;

a ring seal seated in said groove;

a first hub supported coaxially within the inner end of said first coupling member by a plurality of integral spokes extending radially inwardly from the inner periphery thereof, said hub having a spherical socket formed in the axially outer face thereof;

said second coupling member having at the inner end thereof a second, annular flange extending radially outwardly from the outer periphery thereof, the diameter of said second flange being greater than that of said first flange;

a conical housing provided with a spherically formed internal surface and having an open base and an open apex, the base being secured to said second flange at the radially outer portion thereof in a manner so as to define therewith a cup-shaped structure for receiving said first flange therein, whereby said ring seal engages and is in annular line bearing contact with an intermediate portion of said internal, spherical surface of the housing, said ring seal forming the sole engagement means between the first flange and the bearing surface of the conical housing;

a second hub supported coaxially within the inner end of said second coupling member by integral spokes extending radially inwardly from the inner periphery thereof, said second hub having an axial, through bore provided therein;

an elongated pin disposed in said bore for axial sliding movement therein, the forward end of said pin extending axially inwardly beyond the axially inner face of said second hub and having a rounded head for seating engagement within said spherical socket to provide a central, substantially point bearing therebetween said coupling members;

spring means disposed in said bore for continuously applying an axial force on said pin in the direction of said first hub and forcing said coupling members apart; and adjusting means received within the axially outer end of said bore for varying said force and simultaneously varying the force of sealing engagement of said ring seal on the spherical surface of said housing, said adjusting means including an adjusting plug threadedly received in the other end of said axial bore, said plug being adapted on rotation thereof for selectively varying the applied force on said pin and ring seal by compressing said spring; and, said pin further having an annular guide shoulder formed intermediate the ends thereof, and wherein said spring is disposed about said pin intermediate the inner end of said plug and one face of said guide shoulder.

References Cited

UNITED STATES PATENTS

| | | | |
|---|---|---|---|
| 781,862 | 2/1905 | Allen | 285—262 X |
| 859,426 | 7/1907 | Betz | 285—269 X |
| 946,025 | 1/1910 | Elvin | 285—268 X |
| 2,095,728 | 10/1937 | Bard | 285—262 |
| 2,686,529 | 8/1954 | Lanningen | 285—286 X |
| 2,693,971 | 11/1954 | Harrison | 285—269 |
| 3,243,209 | 3/1966 | Chertok | 285—334.4 X |

CARL W. TOMLIN, *Primary Examiner.*

THOMAS F. CALLAGHAN, *Examiner.*